United States Patent [19]
Meadows et al.

[11] Patent Number: 5,378,551
[45] Date of Patent: Jan. 3, 1995

[54] RECHARGEABLE BATTERY CELL HAVING INTEGRAL VIBRATING MEANS

[75] Inventors: Vernon Meadows, Coral Springs; George Thomas, Plantation; Anaba A. Anani, Lauderhill, all of Fla.

[73] Assignee: Motorola, Inc., Schaumburg, Ill.

[21] Appl. No.: 93,570

[22] Filed: Jul. 19, 1993

[51] Int. Cl.⁶ .............................................. H01H 2/14
[52] U.S. Cl. ...................................... 429/66; 429/122; 429/129; 429/191; 429/204
[58] Field of Search ................. 429/66, 122, 129, 191, 429/209

[56] References Cited

U.S. PATENT DOCUMENTS

| | | |
|---|---|---|
| 3,907,603 | 9/1975 | Kocherginsky et al. |
| 3,923,550 | 1/1975 | Von Krusenstierna |
| 4,015,053 | 3/1977 | Von Kursenstierna ............ 429/49 |
| 4,329,406 | 5/1982 | Dahl et al. ............ 429/92 |
| 4,378,385 | 3/1983 | Hughes ............ 427/126.3 |
| 5,019,467 | 5/1991 | Fujiwara ............ 429/127 |
| 5,270,135 | 12/1993 | O'Neil-Bell et al. ............ 429/104 |

FOREIGN PATENT DOCUMENTS

| | | |
|---|---|---|
| 57-180878 | 11/1982 | Japan . |
| 4-274175 | 9/1992 | Japan . |
| 995163 | 2/1983 | U.S.S.R. . |

*Primary Examiner*—Prince Willis, Jr.
*Assistant Examiner*—M. Nuzzolillo
*Attorney, Agent, or Firm*—Dale W. Dorinski

[57] ABSTRACT

A rechargeable battery cell (10) has an integral vibrating means. The cell has a positive electrode (14), a negative electrode (16), and an electrolyte (18) disposed between the two electrodes. The electrolyte contains a piezoelectric material (20) that vibrates when subjected to an alternating electric field. In one embodiment, at least one of the electrodes contains a piezoelectric material that functions as a vibrating means when subjected to an alternating electric field. In another embodiment, a piezoelectric material that functions as a vibrating means when subjected to an alternating electric field is attached as part of a current collector (22) to at least one of the electrodes. The piezoelectric material performs an additional function of being an electronic insulator for the purpose of stacking the cells.

15 Claims, 3 Drawing Sheets

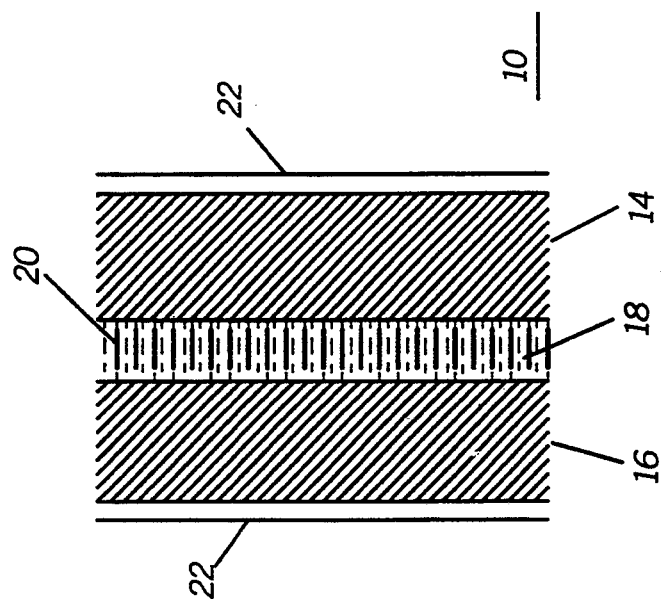
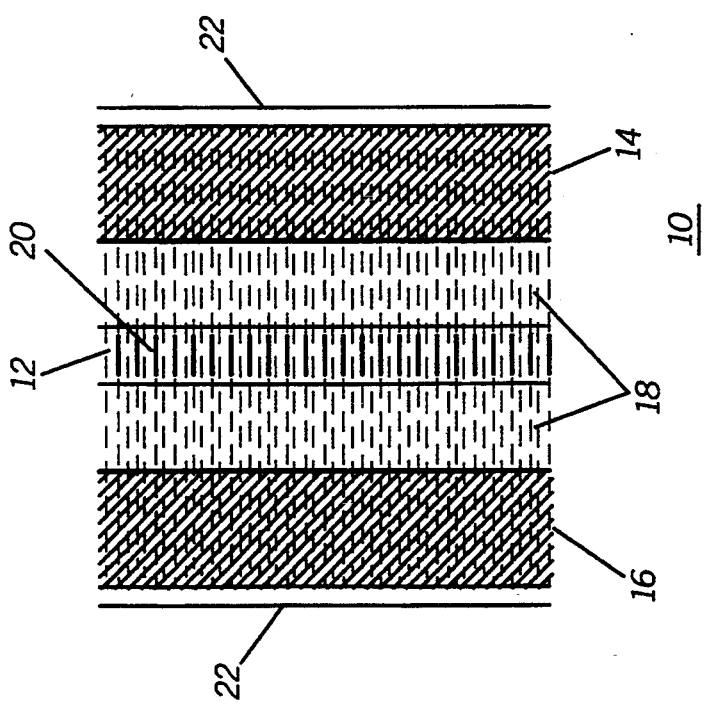

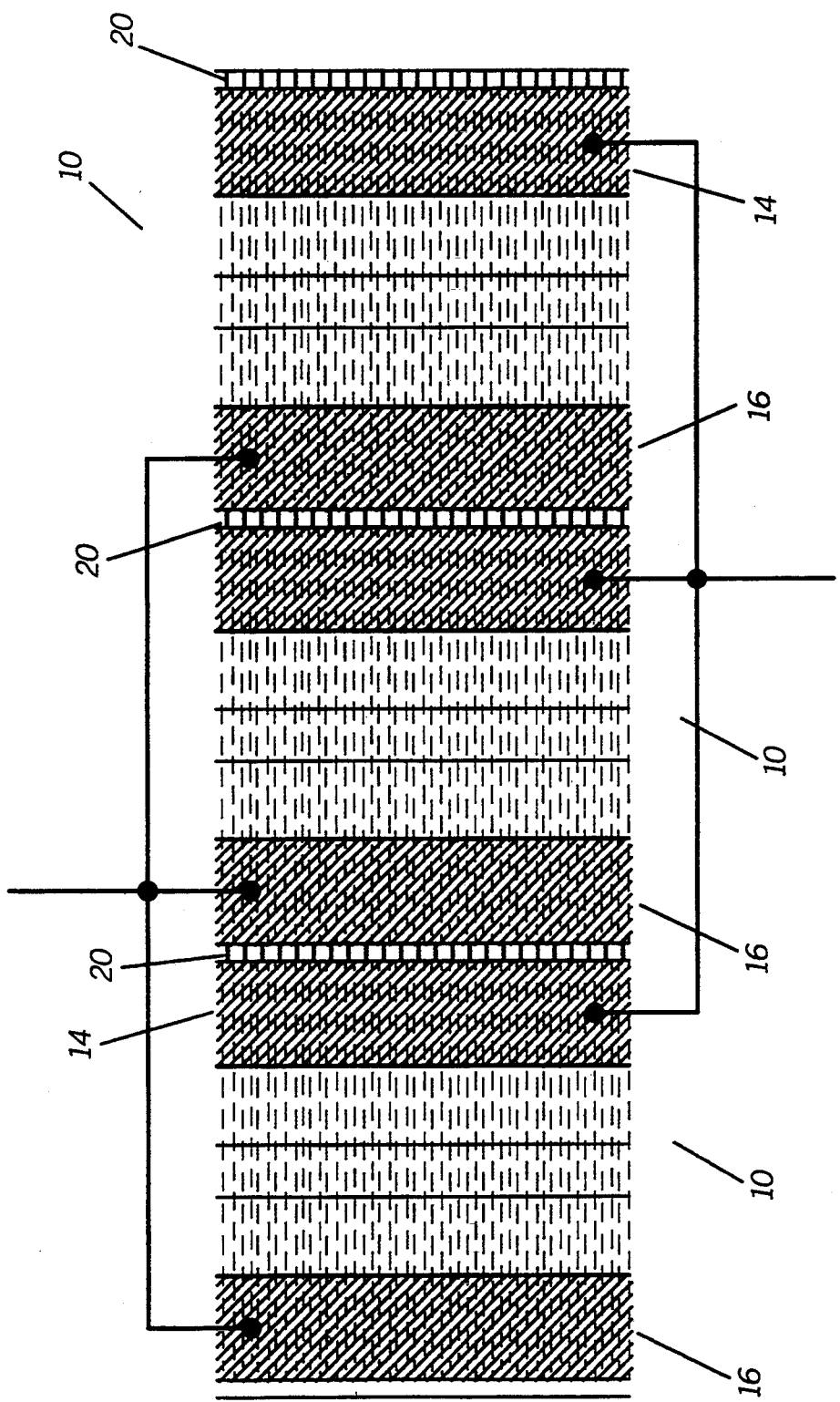

RECHARGEABLE BATTERY CELL HAVING INTEGRAL VIBRATING MEANS

CROSS REFERENCE TO RELATED APPLICATIONS

This application is related to U.S. application Ser. No. 07/981,463, filed Nov. 25, 1992, entitled "Battery Charging and Discharging System and Corresponding Method", by George Thomas, and assigned to Motorola, Inc.

TECHNICAL FIELD

This invention relates in general to rechargeable battery cells, and more specifically to battery cells having a piezoelectric means of vibration.

BACKGROUND

The use of forced convection by mechanical excitation has been used extensively to provide enhanced efficiency of electrochemical processes in the chemical industry. In solution based chemistries, this is often provided in the form of stirring to increase the rate of convective mass transport. In electrochemical plating or deposition, this often gives rise to smoother plating and higher plating rates. More recently, mechanical excitation (or ultrasonic vibration) has been demonstrated to facilitate ion diffusion in electrochemical cells, leading to enhanced charging/discharging efficiencies, higher electrochemical storage capacities as well as improved cycle life of cells. In the patent application of Thomas (U.S. patent application Ser. No. 07/981,463, filed Nov. 25, 1992), a means for providing the mechanical vibration consists of an ultrasonic transducer contained in the battery housing or in a battery charger, and mechanically coupled to the battery cells. In both of these illustrations, the vibrating device as well as the power source from which the device is activated are additional components to the individual battery cell. This translates into added weight and thus reduced energy density of the battery. It would be highly desirable and a significant contribution to the art to make a device that did not have an extra part.

SUMMARY OF THE INVENTION

Briefly, according to the invention, there is provided a rechargeable battery cell with an integral vibrating means. The cell has a positive electrode, a negative electrode, and an electrolyte is disposed between the two electrodes. The electrolyte comprises a piezoelectric material that functions as the vibrating means when subjected to an alternating electric field.

In an alternate embodiment of the invention, there is provided a rechargeable battery cell with an integral vibrating means. A piezoelectric material functions as a separator between the two electrodes, and also as the vibrating means.

In an alternate embodiment of the invention, there is provided a rechargeable battery cell with an integral vibrating means. At least one of the electrodes contains a piezoelectric material that functions as the vibrating means when subjected to an alternating electric field.

In another embodiment of the invention, a piezoelectric material that functions as a vibrating means when subjected to an alternating electric field is attached as part of a current collector of at least one of the electrodes. The piezoelectric material performs an additional function of being an electronic insulator for the purpose of stacking such cells.

BRIEF DESCRIPTION OF THE DRAWINGS

FIG. 1 is a schematic representation of a battery cell in accordance with the present invention.

FIG. 2 is a schematic representation of a battery cell in an alternate embodiment of the present invention.

FIG. 5 is a schematic representation of a stacked battery construction in still another embodiment of the present invention.

DETAILED DESCRIPTION OF THE PREFERRED EMBODIMENT

Figure 3:
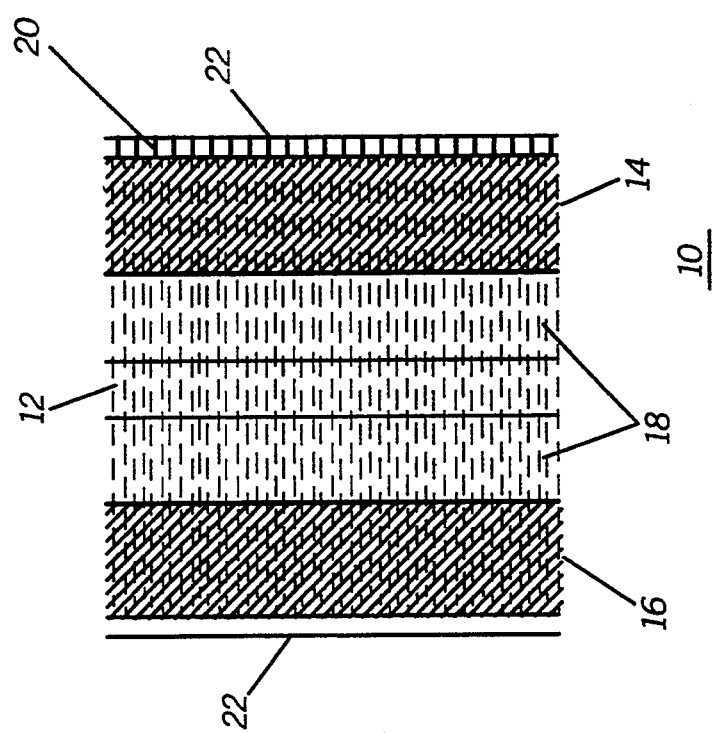
FIG. 3 is a schematic representation of a battery cell in another embodiment of the present invention.

A conventional battery cell has at least three elements: a negative electrode, a positive electrode and an electrolyte. The electrodes must be separated from each other to prevent direct electric contact, thus avoiding short circuiting. The configuration of the electrodes determines the voltage and capacity, and thus the energy, of the cell. For high energy density batteries, the electrodes are often a composite structure, comprising the active material, a binder, the electrolyte, and sometimes a current collector. Each of these components provides a distinct role in the proper and efficient functioning of the electrode. The electrolyte provides the medium for ionic motion into and within the electrodes where the electrochemical reactions take place. Depending on the nature of the electrolyte, the cell may or may not contain another element that serves as an insulating separator. For example, in liquid electrolyte cells where the electrodes are in close proximity, separators are required, and are of a porous nature to allow wetting of the electrodes with the electrolyte, thereby permitting the ionic motion or transfer. In cells having a solid electrolyte, the electrolyte also serves as a separator. Those skilled in the art will appreciate that most cell constructions require that the electrolyte be contained in both the separator and electrode structures.

Ultrasonic vibration increases the rate of mass (in this case ion) transport within the electrolyte and electrodes, leading to reduced recharge times, enhanced electrochemical capacities and improved cycle life of cells that utilize the mechanism. If the means of vibration were now an integral part of the cell, and contained within either the separator, electrolyte, electrodes or combinations thereof, a very efficient charging system would be provided.

In this invention, the means of vibration is a piezoelectric element (e.g., quartz, ceramics, alkali-metal salts, organic polymers, etc.). Piezoelectric materials have the intrinsic property that when they are subjected to an electric field, minute mechanical strains are induced, causing the piezo-material to distort. When the field is removed, the piezoelectric material returns to its original shape. Conversely, when they are subjected to small mechanical strains, they generate electric currents. By turning the field on and off rapidly, the piezoelectric element can be made to vibrate. An alternating (AC) electric field serves this function. This is the principle governing their use as means of mechanical/ultrasonic vibration. Vibration can be provided over a wide frequency range by varying the frequency of the AC field. In addition, piezoelectric materials are electric insulators and they can be made to be porous, as in quartz frits, for example. These properties make them ideal for use as separators, as electrolytes and as insulating layers between stacks in electrochemical cells. Mechanical flexibility of polymer based piezos also make them suitable for conformal battery constructions.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a battery cell 10 has a positive electrode 14, a negative electrode 16, an electrolyte 18 disposed between the positive and the negative electrodes, and a separator 12 preventing direct electrical contact between the electrodes. The electrolyte 18 provides the ionic connection between the positive and negative electrodes, and the separator 12 is wholly or partially a piezoelectric element 20. If the electrolyte 18 is a liquid, then the liquid is absorbed within the porous structure of the piezoelectric separator 12, providing the necessary ionic connection. If the electrolyte 18 is a solid, as shown schematically in FIG. 2, then the piezoelectric element 20 is embedded within the electrolyte, or it is the solid electrolyte, thereby eliminating the need for a separator and providing dual functionality. Ionic connection is again provided between the electrodes by the electrolyte.

Referring now to FIG. 3, an alternate embodiment of the invention, the vibrating means is contained within one or both of the electrodes 14 or 16. When the electrode 14 is subjected to an alternating electric field, piezoelectric element 20 contained in the electrode functions as the vibrating means, causing the entire cell 10 to vibrate. This construction can be used in both liquid and solid electrolyte cells. Liquid electrolyte systems may require a separator 12, depending upon the state of physical separation between the electrode pairs.

The battery electrode contains a means for the transport of electric current in addition to the electroactive materials. During the charging process, a small AC signal is superimposed on the Direct Current (DC) signal, and applied to the battery cell 10 via appropriate current collectors 22 contained in the cell as substrates or contained within the electrodes. The DC signal performs the usual charging of the cell, and the AC field provides the necessary small displacements or strains on the piezoelectric element 20, causing it to vibrate the entire cell. The current collectors of the battery cell are used as the current leads for providing the vibration and charging of the cell. The current collector in the composite electrodes should be in direct contact with the vibrating means so that the necessary current can be applied.

Figure 4:
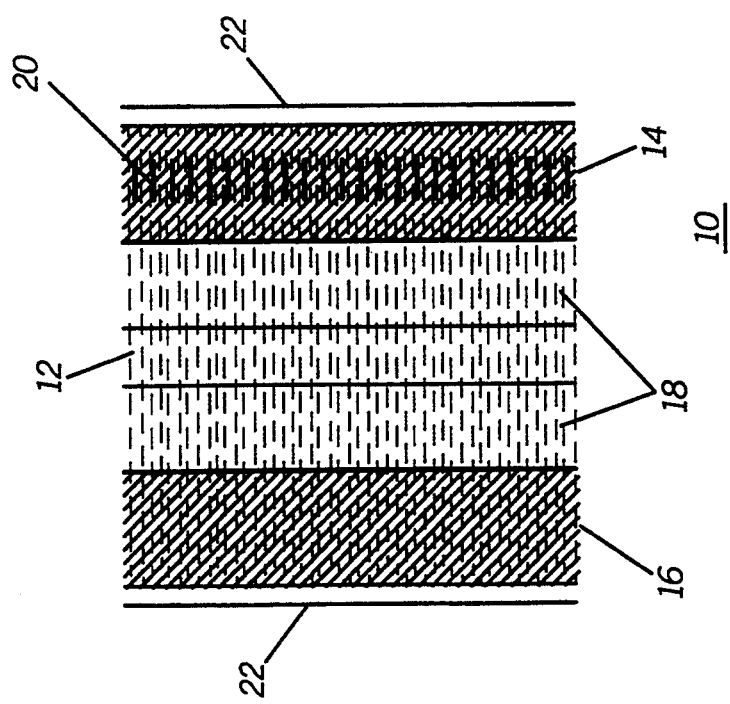
FIG. 4 is a schematic representation of a battery cell in another embodiment of the present invention.

Referring now to FIG. 4, still another embodiment of this invention, the piezoelectric material 20 that functions as the vibrating means is adhered to, mixed with, embedded, or otherwise contacted as a dispersed layer, coating, laminate or mixture, with, or as part of the current collector 22 of at least one of the electrodes 14 or 16. When cells utilizing these current collectors are stacked in some fashion, say back-to-back, the piezoelectric materials, being electronic insulators, act as the insulating layer in the cell assembly. This configuration is schematically illustrated in FIG. 5. In electronic applications such as radio communication devices, it is often customary to arrange cells in series to provide a multiple of the single cell voltage, or in parallel to yield a higher storage capacity. A battery package designed for this application is manufactured by arranging a plurality of cells 10 between a pair of electrically insulating layers 20, such that one layer isolates opposite terminals of the cells.

Each of the examples given above constitutes a battery cell or cell stack with integral vibration means. During charging of these cells, the electroactive species is oxidized at the positive electrode. The positive ion liberated at this electrode is transported through the electrolyte to the negative electrode where the necessary electrochemical reaction takes place to store energy in the cell. The rate of positive ion migration through the electrolyte is a direct function of the ionic conductivity of the electrolyte. The migration rate as well as the rate of ion diffusion within the electrode structures together determine the charging limits of a given cell. The rate at which ions are transported can be altered by mechanical vibration, preferably at ultrasonic frequencies, to provide the necessary convective mass transport. In the cell designs of the above examples, the vibration is effected via the piezoelectric element in the cells. During charging, an alternating signal superimposed on the DC charging current is simultaneously supplied to the piezo element(s) via the cell current collectors. This induces vibration in the piezo, with the result that the entire cell vibrates, increasing the mass transport of the primary ions across the electrolyte from one electrode to the other, and also within the electrode structures. This invention is not restricted to any one particular cell chemistry or design. It can be applied to all rechargeable batteries, for example, lead-acid, nickel-cadmium, nickel-metal-hydride, lithium, etc., but the most preferred application is in cells with a solid-state electrolyte construction. These cells seem to have relatively lower ionic conductivities than cells with liquid electrolyte constructions. Because of the solid nature of all the components in solid state cells, diffusion of ions seem to be the only effective means of mass transport available in these types of cells. This results in the sole dependence of ionic motion in the electrolyte and within the electrodes during charging processes on diffusion.

In the prior art, the means of vibration is contained either within the charger system or within the battery pack or housing, as a separate component. This translates not only to additional weight of the battery pack and charger system, but also requires additional electrical leads from the power source to the vibrating means. In the present invention, the means of vibration is an integral part of the cell, thus providing a compact structure for the entire cell. No additional current leads other than the ones necessary for cell charging are required, and because one item is replaced with another there is no additional weight. This compact cell design provides an efficient means to ultrasonically vibrate a cell to yield faster mass transport, leading to enhanced charging efficiencies, and reduced recharge times without any adverse effect on rated capacities. Because cells can now be charged at faster rates, the useful storage capacities amassed at a given charge rate will be higher. Additionally, the enhanced efficiency of the electrochemical processes leads to enhanced cell cycle life.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rechargeable battery cell, comprising:
   a positive electrode;
   a negative electrode; and
   an electrolyte disposed between the positive electrode and the negative electrode, the electrolyte comprising a piezoelectric material.

2. A recharge battery cell, comprising:
   a positive electrode;
   a negative electrode; and
   a piezoelectric separator selected from the group consisting of piezoelectric quartz piezoelectric ceramic, and piezoelectric polymers disposed between the positive electrode and the negative electrode.

3. The rechargeable battery cell of claim 1, wherein the piezoelectric material is porous.

4. The rechargeable battery cell of claim 1, wherein an alternating electric field is imposed upon the piezoelectric material so as to cause it to vibrate.

5. A rechargeable battery cell, comprising:
   a positive electrode;
   a negative electrode;
   a piezoelectric material disposed between the positive electrode and the negative electrode; and
   an electrolyte providing ionic conduction between the electrodes.

6. The rechargeable battery cell of claim 5, wherein the piezoelectric material is a separator.

7. The rechargeable battery cell of claim 5, wherein the piezoelectric material is porous.

8. The rechargeable battery cell of claim 5, wherein an alternating electric field is imposed upon the piezoelectric material so as to cause it to vibrate.

9. A rechargeable battery cell, comprising:
   a first electrode;
   a second electrode comprising a piezoelectric material; and
   an electrolyte disposed between the electrodes.

10. The rechargeable battery cell of claim 9, wherein the piezoelectric material is a separator.

11. The rechargeable battery cell of claim 9, wherein the piezoelectric material is porous.

12. The rechargeable battery cell of claim 9, wherein an alternating electric field is imposed upon the piezoelectric material so as to cause it to vibrate.

13. A rechargeable battery cell, comprising:
    a positive electrode;
    a negative electrode; and
    a solid electrolytic material disposed between the positive electrode and the negative electrode, the electrolytic material comprising a porous piezoelectric material having an alternating electric field imposed upon it to cause the piezoelectric material to vibrate.

14. A rechargeable battery cell, comprising:
    a positive electrode;
    a negative electrode;
    an electrolyte disposed between the positive electrode and the negative electrode; and
    a current collector attached to the positive electrode, comprising a piezoelectric material.

15. A rechargeable battery cell, comprising:
    a positive electrode;
    a negative electrode;
    an electrolyte disposed between the positive electrode and the negative electrode; and
    a current collector attached to the negative electrode, comprising a piezoelectric material.

* * * * *